April 15, 1952
A. SEARLES
2,592,605
HYDRAULIC SCREENING
Filed May 7, 1948
3 Sheets-Sheet 1
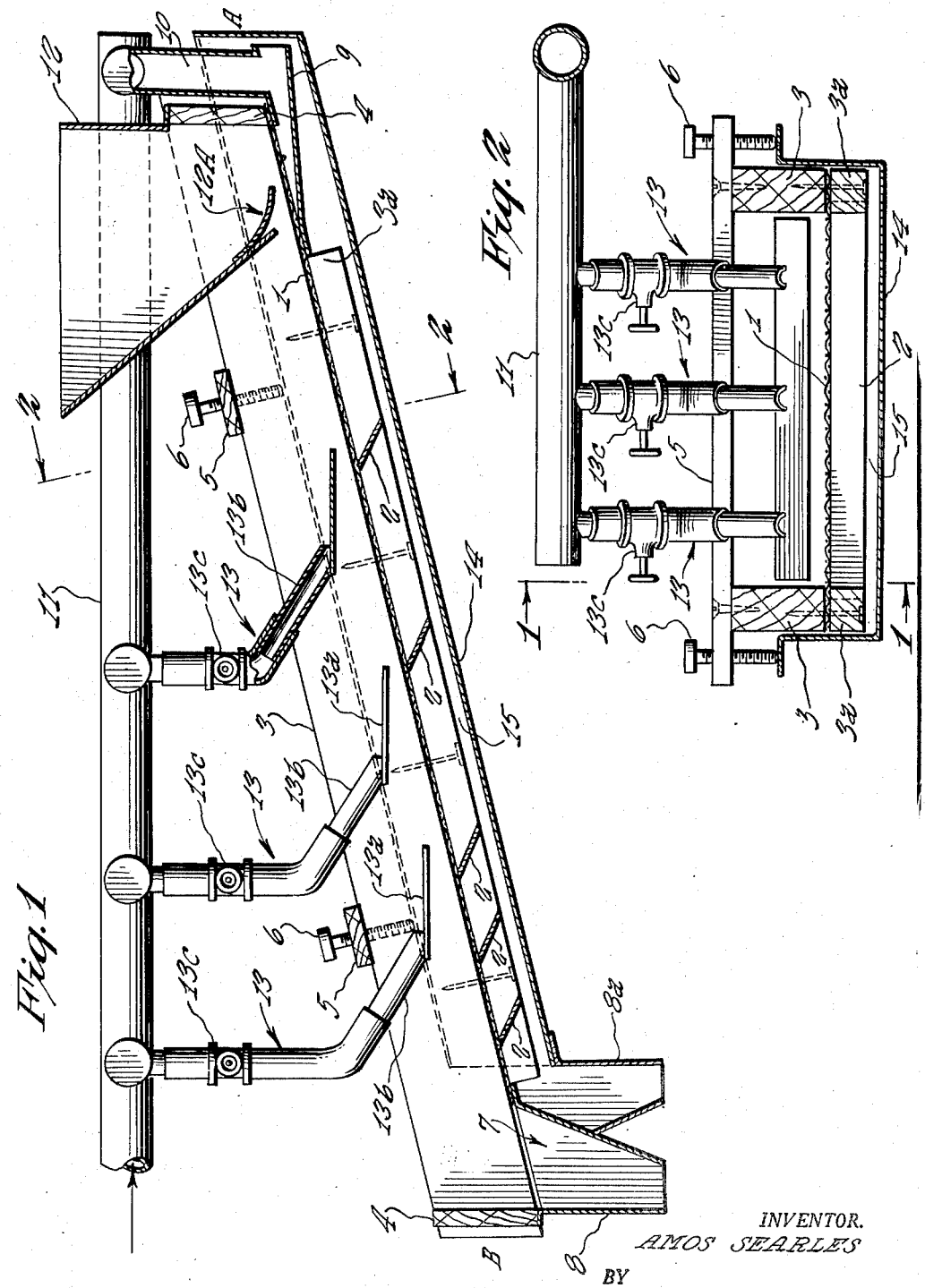
INVENTOR.
AMOS SEARLES
BY
Moses, Nolte, Crews + Berry
ATTORNEYS

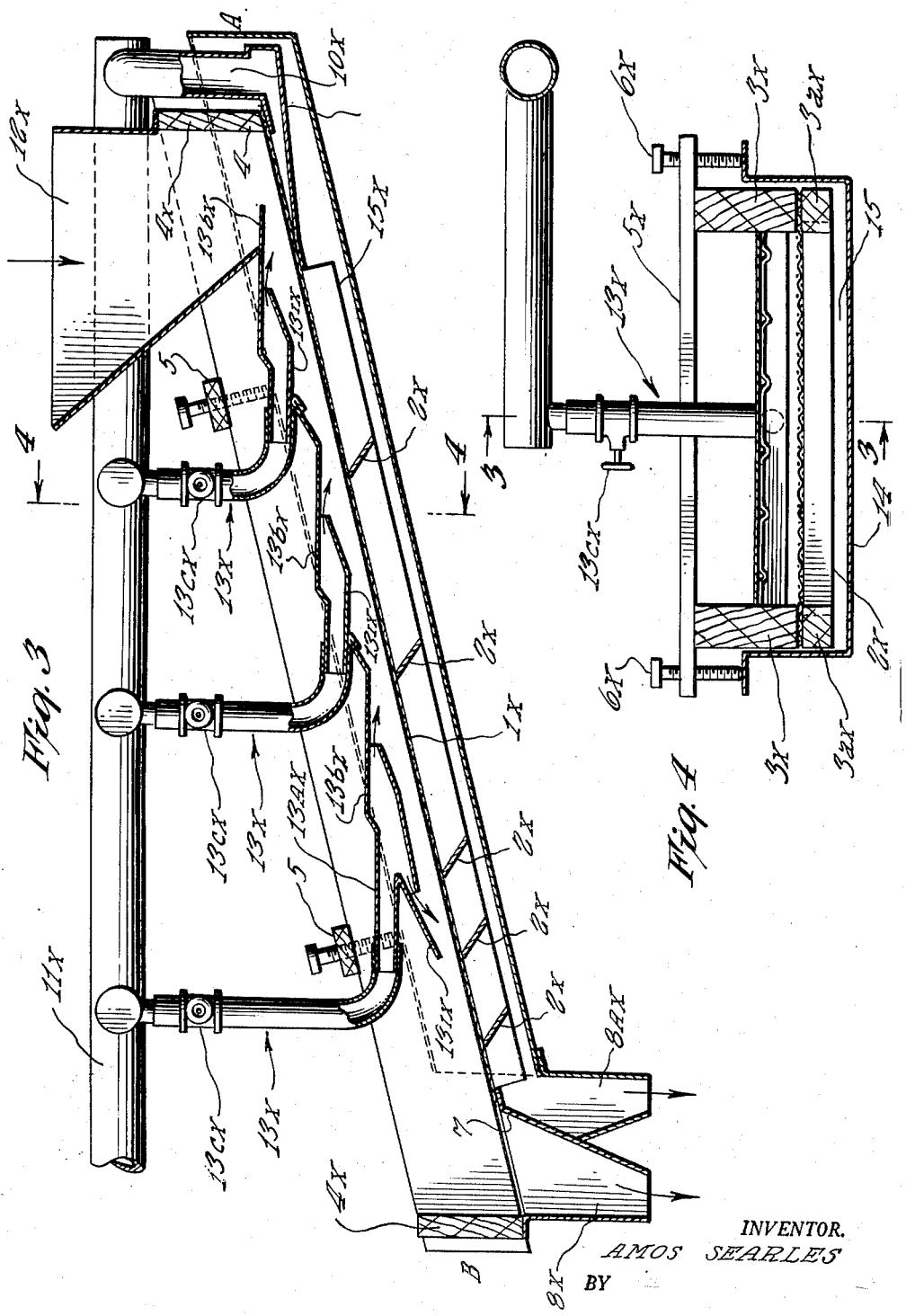

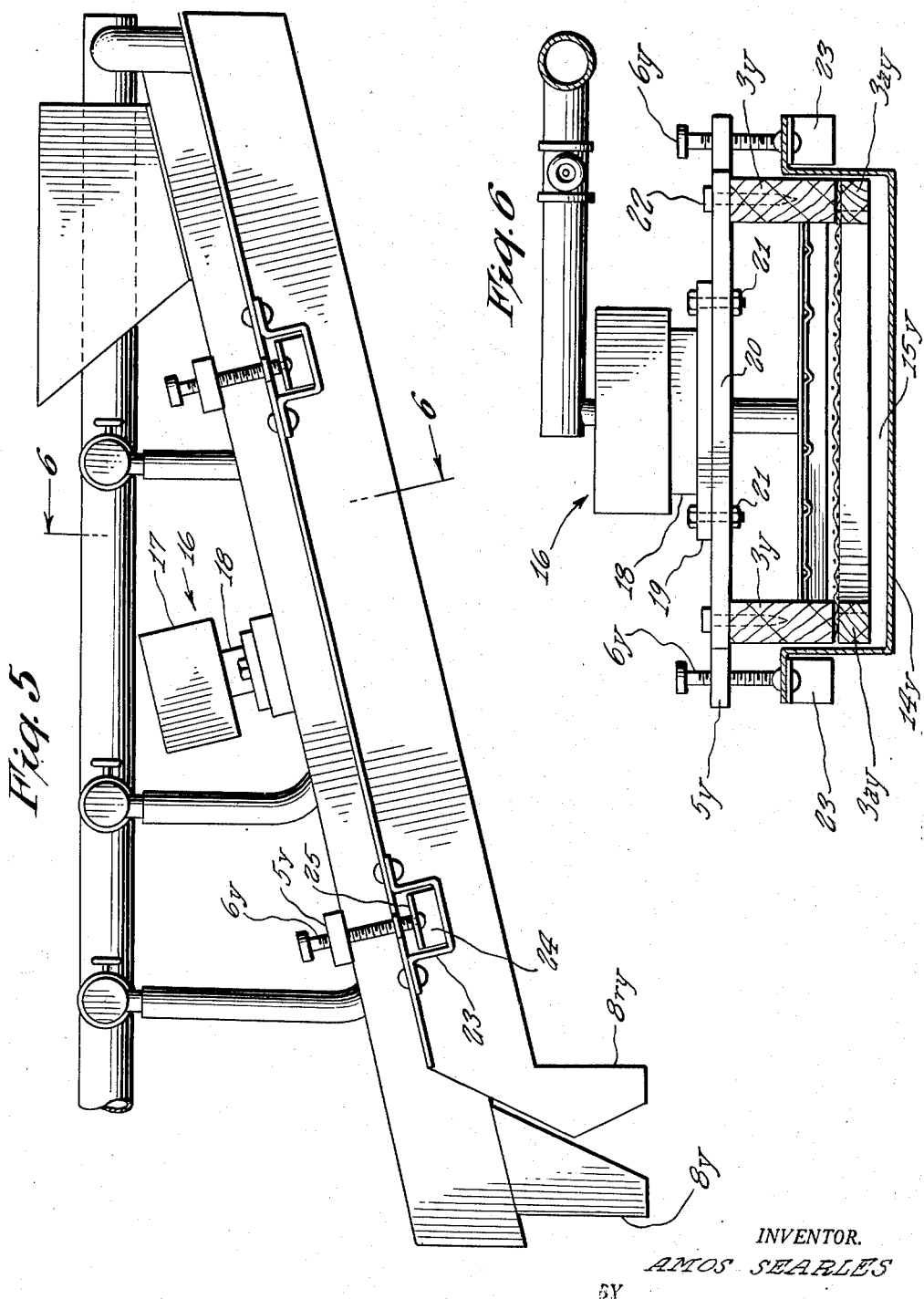

Patented Apr. 15, 1952

2,592,605

UNITED STATES PATENT OFFICE 2,592,605

HYDRAULIC SCREENING

Amos Searles, Scranton, Pa.

Application May 7, 1948, Serial No. 25,539

8 Claims. (Cl. 209—269)

This invention relates to hydraulic screening and has for its primary object to increase the efficiency and thoroughness of screening operations.

It has heretofore been proposed to provide an inclined screen with steps or riffles underneath it. In accordance with such prior proposals, material to be screened together with wash-water are deposited at the upper end of the screen. The steps or riffles underneath the screen come near to the screen at separated points, being designed to produce a series of waves or ripples which flow upwardly through the screen from underneath for dislodging material which may tend to clog the mesh of the screen.

The principal thus proposed for keeping the screen mesh open and freely operating is a desirable one, but the prior art structures have not worked well in practice. The principal reason for this is that the material that has passed through the screen tends to accumulate upstream from the riffles and to alter the contour of the stream bed, so that the character of flow is not the desirable one which would be obtained if the stream bed retained its original contour. Instead the amplitude of the waves is greatly reduced so that the wash-water tends to flow rapidly along above the level of the riffles and above and below the screen. Return of all the wash-water, moreover, to the upper side of the screen tends to carry the undersize material up through the screen, and, in a measure to defeat the very purpose of the sizing apparatus.

In accordance with the present invention the above mentioned drawback is overcome by providing an inclined screen and a novel arrangement of water deflectors beneath the screen to cause the water to surge upwardly through the screen at intervals, the deflectors being terminated at their lower edges somewhat above the stream bed, so that there is a free flow space underneath the deflectors for carrying away the settled material and thereby avoiding accumulation of it. With this kind of arrangement the originally intended contour is maintained and the originally intended flow characteristics of the water are maintained.

The cross-sectional form of the deflectors and the disposition of them are very important. Since it is intended to recirculate water up through the screen it is necessary to avoid the inclusion of the undersize material that has already passed down through the screen and settled in the trough flow near the bottom. It is of great importance that in deflecting the upper, more material free zone of flow that turbulence tending to disturb and recontaminate the deflected water be avoided. It is desirable, therefore, that the deflectors incline only slightly away from the trough and that they present a sharp flow dividing edge to and against the stream flow, which at the operable pitch of the screen and trough has considerable velocity.

In accordance with a further feature of the invention the material to be separated is deposited upon the screen at the upper end thereof and the principal body of the wash-water may be introduced from underneath the screen so that it tends to pick up the deposited material and carry it along.

In accordance with a still further feature of the invention, further wash-water is projected at intervals along the screen in a direction counter to the general direction of flow, this water serving to retard and agitate the material flowing over the screen and to retard the speed of flow, thus assisting in screen selection.

An apparatus embodying the novel features above referred to operates very satisfactorily, and can be utilized to advantage whether or not the screen is jigged. For some purposes, however, jigging of the screen is found to work out advantageously. It is accordingly a feature of the invention that rapid, small amplitude, vertical jigging or pulsation of the screen relative to the trough is provided for causing the water to surge up and down through the screen. This expedites the screening action and reduces the amount of included water in the oversize material.

Other objects and advantages will hereinafter appear.

In the drawing forming part of this specification.

Fig. 1 is a fragmentary view in sectional side elevation of a practical and advantageous separator which embodies features of the invention, the section being taken upon the line 1—1 of Fig. 2, looking in the direction of the arrows;

Fig. 2 is a view in transverse sectional elevation of the structure shown in Fig. 1;

Fig. 3 is a view similar to Fig. 1 but showing a modified structure. The section being taken upon the line 3—3 of Fig. 4 looking in the direction of the arrows;

Fig. 5 is a fragmentary view in side elevation of apparatus generally similar to that of Figs. 3 and 4, but in which mechanism is provided for pulsating the screen; and Fig. 6 is a sectional view taken upon the line 6—6 of Fig. 5 looking in the direction of the arrows.

The illustrative apparatus of Figs. 1 and 2 is desirably designed to treat fine wet materials from one-quarter inch mesh to zero. The mechanism functions by hydraulic action without mechanical reciprocation or pulsation.

The structure comprises a screen 1 that is sloped uniformly and adjustably downward from the feed end A toward the discharge end B. The screen does not slope from side to side, but is horizontal in transverse section. The screen 1 is supported from underneath by longitudinally spaced transversely extending rigid, slender strips or deflecting plates 2. The deflecting plates 2 are in turn supported at each end beyond the lateral bounds of the open screen area by means of rigid longitudinal members 3 and 3a. The members 3 extend lengthwise from the feed end A to beyond the discharge end B and serve as sides to form a trough with the screen deck as the bottom of the trough. The longitudinal members 3 are held in spaced parallel relation by means of suitable transverse members 4 which may be located at opposite ends of the structure. The longitudinal members 3 are also spaced from one another by connecting them with transverse members 5. The members 5 extend across the top edges of the longitudinal members 3, intermediate the ends of the latter. The end spacing members 4 are equal in length to the width of the screen deck. Thus, a plan of the trough is in the form of a box with two sides, two ends, and a bottom, with the bottom, which is the screen deck, supported on the deflecting plates 2. At the discharge end the screen deck does not cover the bottom, but is interrupted so that a short, clear opening 7 is provided for delivering into the discharge chute 8 all material which is too coarse to pass through the screen. The chute 8 is attached to the screen supporting members and serves to direct the flow of material to appropriate retaining receptacles (not shown).

In the form of construction illustrated in Figs. 1 and 2, a structure is provided for introducing water at the introductory end from beneath the screen, so that the water is caused to pass upward through the screen at the very point where the material to be treated is deposited upon the screen. The water passes downward through a conduit 10 into a shallow box 9, which is open at its top immediately under the screen. The box 9 is attached to the side longitudinal screen supporting members 3, filling the space between them and to the upper end spacing and enclosing member 4 of the screen trough.

The complete separator unit as thus far described, with the exception of the structure at the delivery end which is disposed beyond the end of the screen 1 is embraced by a trough 14. The trough 14 comprises a bottom wall, upstanding side walls, and marginal outturned flanges. Screws 6 bear on the flanges of the trough 14 and are threaded through the members 5 so that the screen deck is adjustably supported from the trough through the members 5 and the screws 6.

The enclosing trough extends beyond the upper end of the screen 1 and includes an end wall that extends upward above the screen. The trough serves as a flow channel or underflow deck for water and for material which has passed through the screen.

The screws 6 are desirably so adjusted that a clearance space 15 is maintained between the lower edges of the deflector plates 2 and the upper surface of the trough bottom. The adjustment of the screws 6 can be so chosen that the lower edges of the deflector plates 2 are located nearer and nearer to the bottom of the trough 14 as the lower end of the separator is approached or, if desired, the lower edges of the deflector plates can be located farther and farther from the bottom of the trough as the lower end of the separator is approached.

The optimum adjustment of the screen deck relative to the trough will depend upon several factors. There is an increasing velocity of the underflow stream so that more and more water can be passed in a given time through a flow space of a given cross-sectional area as the lower end of the stream is approached. On the other hand, water is added from above by successive sprays so that there is more and more water to be disposed of through the underflow stream as the lower end of the stream is approached.

The increasing velocity of the underflow stream tends to cause the deflectors to scoop up or deflect more of the flow and divert it up through the screen. It is generally desirable, therefore, to progressively elevate the lower edges of the deflectors above the underflow deck surface to compensate for the effect of the increasing velocity of the underflow stream. In addition, closer spacing of the deflectors longitudinally of the separator near the discharge end maintains a condition desirable for the discharge of oversize without including an excessive quantity of water and the consequent possibility of recontamination by included undersize.

The deflecting plates 2 are inclined, being disposed to diverge in a downstream direction slightly away from the trough bottom in attitudes to divert a portion of the flowing water upward through the screen as described.

In operation the screening means may be supplied with water through the inlet 10 from a suitable pipe system 11. The water may be delivered into the distributor box 9 at sufficient pressure and in sufficient volume to cause it to flow up through the screen area over the distributor box 9, and through the material which is delivered in regulated quantity onto the upper end of the screen from a hopper 12. The water flow sweeps up and dilutes the material, and washes it downward toward the discharge end of the screen with the undersize being flushed down through the screen into the underflow channel 15 between the lower edges of the deflector plates 2 and the underflow deck 14. As the flow progresses over the upper screen surface, the water tends to drain down through the screen and carry the undersize particles with it. There is a sufficient flow of water in the under stream beneath the deflecting plates 2 to cause all the undersize material which settles out of the principal water stream to be carried away beneath the deflector plates and delivered to the discharge chute 8a.

A portion of the flowing water which has passed downward through the screen is deflected upward by the deflecting plates 2 and caused to surge through the screen in an upward direction, thereby tending to agitate the material and flush out of the screen mesh particles which tend to hang in and obstruct the mesh of the screen. Since the underflow stream carries away the settling material, the contour of the stream bed is not progressively altered during operation, and the deflecting action of the deflecting plates 2 continues to be performed with uniform efficiency for an indefinite period.

The jets 13, spaced longitudinally over, and extending across the screen deck, and directed against the flow of material, for flushing the surface of the screen, depend more on the velocity of water discharge than upon the volume of the water to retard and thus control the flow of material over the screen. The retardation increases the effectiveness of screening by limiting the speed of the particles. In this way the undersize gains time to pass through the screen. The jets also agitate the material so that it circulates advantageously, thereby permitting the selective action.

The underflow flushes the screen and removes undersize particles that pass through, thus preventing the effects of capillarity and surface tension that would otherwise restrict the movement of wet particles on and through the screen. With proper adjustment and spacing of the underflow deflector plates 2, a portion of the underflow may be caused to flush oversize material off the screen at the discharge end. The relatively large area over which this flushing and underflow water travels under the screen, and its shallow depth, favor the settling of the undersize particles, so that these particles are carried to the discharge end without objectionable recirculation up through the screen by the diversion created by the deflecting plates 2.

Underflow screen flushing depends upon the vertical adjustment of the screen 1 and the deflector plates 2 relative to the upper surface of the underflow deck 14. If the space beneath the deflector plates is made sufficiently deep to permit all the underflow to pass under the edges of the plates, no screen flushing will take place to assist the jet sprays 13, and the material will tend merely to accumulate upon the screen. When adjustment is such that the lower edges of the deflector plates 2 are below the surface of the underflow, a portion, due to the velocity of flow and the angular pitch of the deflector plate, is retarded and diverted upward through the screen after which it flows back down through the screen to mingle with the retarded flow created by the succeeding deflector plate. Thus an area exists between successive deflector plates of comparatively slack water favorable for the settlement of material, under which is a flow of relatively high velocity induced by the pitch of the underflow deck that rapidly carries away and discharges the undersize material.

Blinding of the screen is minimized by the water currents, to wit., the upward flow of the underflow water, and the cleaning action of the jets. The reduced effective weight of the material which is practically maintained in fluid suspension by the underflow and the jets also helps to avoid clogging of the screen.

Close spacing of the deflector plates toward the discharge end, as shown, causes the screen deck 1 to be more uniformly and effectively flushed, so that the oversize material tends to be flushed off by virtue of the reduced relative weight and the velocity of the water.

The construction illustrated in Figs. 3 and 4 is generally similar to that of Figs. 1 and 2. The separator unit is identical, with the exception that the material hopper is slightly modified. The spray system, however, differs in some features from the spray system of Figs. 1 and 2.

In Figs. 3 and 4 the same reference characters have been employed where the parts are unaltered with the subscript "x" added in each instance, and no detailed description of these parts will be given.

The water manifold 11x feeds a conduit 10x as before for supplying water to the shallow pan 9x. The manifold 11x also feeds sprays 13x which are provided with their individual manually operable control valves 13cx. The water is discharged through nozzles 13ax, which terminate in guide plates 13bx. In this instance the streams are discharged underneath the guide plates rather than on top of them. The uppermost nozzle has its guide plate extended underneath the hopper 12x, and the spray is directed right into the material that drops from the hopper onto the screen at the point where the water is surging upward through the screen from the shallow pan 9x.

The lowermost nozzle 13ax is constructed like the others, except that it has a downstream outlet and a downstream guide plate 13bx for directing a spray onto the delivery end of the screen to assist in driving the coarse material off of the screen and into the discharge chute 8.

Spray plates 13bx constitute a continuous cover over the screen, which tends to suppress the amplitude of agitation created by the spray jets and thus hold the material in close proximity to the screen.

The form of the invention illustrated in Figs. 5 and 6 is desirably the same as that illustrated in Figs. 3 and 4, with the exception that provision is made of means for pulsating the screen and screen frame relative to the other separator structure.

Since the parts are in general the same as those illustrated in Figs. 3 and 4, corresponding reference characters have been applied to parts which are unaltered with the subscript "y" either added or substituted for the subscript "x" in each instance, and no detailed description of the parts so designated will be given.

A vibrator 16 having a casing 17 is supported independently of the separator structure. The vibrator may be either an electrical, pneumatic or hydraulic commercial unit and is desirably adapted to impart vibration having an amplitude of .010 inch at a rate suitable to assist in the screening action of the other means. The purpose of the vibrator is to pulsate the complete screen with its frame members and deflector plates independently of and relative to the underflow chute 14y.

This develops a jigging effect, creating alternate upward and downward displacement and a consequent flow through the screen that adds to and intensifies the otherwise normal deflector produced flow up through and down through the screen. First, the upward surge tends to float and rearrange the material, and also to relieve blinding. Second, the downward flow is increased generally over the surface of the screen to promote the passage of undersize through the screen. If the pulsating means have an amplitude of .010 inch and a rate of 3600 vibrations per minute, the total displacement of water per square foot of screen can amount to as high a rate as $3600 \times .010 \times 12 \times 12 = 5184$ cubic inches, per minute, or nearly 22.5 gallons up through and down through the screen, regardless of the quantity of flow in the underflow chute. This quantity of flow up through and down through the screen is, of course, considerably reduced by the effects of friction and inertia.

The vibrator 16 is connected through a vibratory member 18 to a plate 19, and the plate 19 is in turn rigidly connected to bars 20 by bolt and nut combinations 21. The bars 20 are affixed to side members 3y by means of any suitable fasteners such as nails 22. The flanges of the trough member 14y have secured to them brackets 23 to which resilient blocks 24 are made fast. The blocks are desirably of rubber which is vulcanized to the brackets. The blocks 24 are also vulcanized to plates 25, to which adjusting screws 6y are rotatably connected. The trough member 14y is supported from the ground, and supports the separator structure through the blocks 24. The separator structure can be adjusted in its normal relation to the trough 14y through the adjusting screws 6y, which are threaded in the bars 5y. This indicates one means of creating the desired pulsations.

I have described what I believe to be the best embodiments of my invention. I do not wish, however, to be confined to the embodiments shown, but what I desire to cover by Letters Patent is set forth in the appended claims.

I claim:

1. A separator comprising, in combination, an inclined continuous screen, an inclined continuously accessible trough beneath the screen into which the wash water and screened material pass directly from the screen, and thin inclined deflectors disposed at intervals beneath the screen, said deflectors extending laterally throughout the width of the screen and having their upper edges in contact with the screen, with surfaces sloping downward from the upper edges toward the introductory end of the separator and terminating so as to present their lower edges against the flow in the trough sufficiently above said trough to permit the lower part of said flow to pass underneath said edges, but to divert the upper portion of said flow upward and through the screen to apportion the flow between upper and lower parallel streams.

2. A separator comprising, in combination, an inclined continuous screen, an inclined continuously accessible trough beneath the screen into which the wash water and screened material pass directly from the screen, and thin inclined deflectors disposed at intervals beneath the screen, said deflectors extending laterally throughout the width of the screen and having their upper edges in contact with the screen, with surfaces sloping downward from the upper edges toward the introductory end of the separator and terminating so as to present their lower edges against the flow in the trough sufficiently above said trough to permit the lower part of said flow to pass underneath said edges, but to divert the upper portion of said flow upward and through the screen to apportion the flow between upper and lower parallel streams, the clearance between the deflectors and the trough bottom being progressively varied from the introductory end to the delivery end of the separator, whereby the diverted flow through the screen is regulated to compensate for volumetric flow variations in the trough due to increasing velocity of the flow.

3. A separator comprising, in combination, an inclined continuous screen, an inclined continuously accessible trough beneath the screen into which the wash water and screened material pass directly from the screen, and thin inclined deflectors disposed at intervals beneath the screen, said deflectors extending laterally throughout the width of the screen and having their upper edges in contact with the screen, with surfaces sloping downward from the upper edges toward the introductory end of the separator and terminating so as to present their lower edges against the flow in the trough sufficiently above said trough to permit the lower part of said flow to pass underneath said edges, but to divert the upper portion of said flow upward and through the screen to apportion the flow between upper and lower parallel streams, the clearance between the deflectors and the trough bottom being progressively varied from the introductory end to the delivery end of the separator, and adjusting means for separately adjusting the clearance between the deflectors and the trough bottom at the opposite ends of the screen.

4. In a separator, in combination, an inclined screen, mechanism for delivering material onto the screen at the upper end thereof, a pan disposed beneath the upper end of the screen, a conduit for delivering water to the pan, the pan having an upwardly facing opening disposed closely adjacent to the screen immediately beneath the screen area onto which material is delivered for forcing substantially all of the overflow from the pan upward through the screen in that area, and a sloping trough disposed beneath the screen for catching, confining and guiding downward along the screen the water delivered to the screen.

5. In a separator, in combination, an inclined screen, mechanism for delivering material onto the screen at the upper end thereof, a pan disposed beneath the upper end of the screen, a conduit for delivering water to the pan, the pan having an upwardly facing opening disposed closely adjacent to the screen immediately beneath the screen area onto which material is delivered, for forcing substantially all of the overflow from the pan upward through the screen in that area, a sloping trough for conducting the water downward along the screen, and a series of nozzles disposed at intervals above the screen and constructed to project water toward the upper end of the screen, the uppermost nozzle being directed to play upon the material en route to the screen.

6. In a separator, in combination, an inclined screen, mechanism for delivering material onto the screen at the upper end thereof, a pan disposed beneath the upper end of the screen, a conduit for delivering water to the pan, the pan having an upwardly facing opening disposed closely adjacent to the screen immediately beneath the screen area onto which material is delivered, for forcing substantially all of the overflow from the pan upward through the screen in that area, a sloping trough for conducting the water downward along the screen, a series of nozzles disposed at intervals above the screen and constructed to project water toward the upper end of the screen, and a final nozzle constructed to project water toward the delivery end of the screen to sweep the oversize material off the screen.

7. A separator comprising, in combination, an inclined continuous screen, an inclined continuously accessible trough beneath the screen into which the wash water and screened material pass directly from the screen, and thin inclined deflectors disposed at intervals beneath the screen, said deflectors extending laterally throughout the width of the screen and having their upper edges in contact with the screen, with surfaces sloping downward from the upper edges toward the introductory end of the separator and terminating so as to present their lower edges against the flow in the trough sufficiently above said trough to permit the lower part of said flow to pass underneath said edges, but to divert the upper portion of said flow upward and through the screen to apportion the flow between upper and lower parallel streams, the screen and the deflectors jointly forming a screen unit, and adjusting mechanism for adjusting the slope of the screen unit relative to the trough.

8. A separator comprising, in combination, an inclined screen, an inclined uninterrupted trough beneath the screen for catching and confining the total fluid flow, deflecting plates disposed at intervals beneath the screen to divert a portion of said flow upward through the screen, the trough defining an underflow space beneath the deflecting plates through which settled material is flushed away to the end of the trough, a rigid support for the trough, connecting means between the trough and the screen, and a vibrator for pulsating the screen relative to the rigidly fixed trough substantially vertically through a range of small amplitude and at audio frequency.

AMOS SEARLES.

REFERENCES CITED

The following references are of record in the file of this patent:

UNITED STATES PATENTS

| Number | Name | Date |
| --- | --- | --- |
| 245,340 | Behr | Aug. 9, 1881 |
| 538,794 | Rockteschel | May 7, 1895 |
| 577,356 | Christensen | Feb. 16, 1897 |
| 833,579 | Shmeleff | Oct. 16, 1906 |
| 952,061 | Akins | Mar. 15, 1910 |
| 1,048,171 | Hughes | Dec. 24, 1912 |
| 1,072,879 | Sturtevant | Sept. 9, 1913 |
| 1,111,217 | Cole | Sept. 22, 1914 |
| 1,202,375 | Fraser | Oct. 24, 1916 |
| 1,312,324 | Hawkins | Aug. 5, 1919 |
| 1,474,893 | Crocker | Nov. 20, 1923 |
| 1,685,621 | Allen | Sept. 25, 1928 |
| 1,735,067 | Weston | Nov. 12, 1929 |
| 2,211,895 | Hoyois | Aug. 20, 1940 |
| 2,267,327 | Ellen | Dec. 23, 1941 |